(12) United States Patent
Van Langen et al.

(10) Patent No.: US 6,904,464 B1
(45) Date of Patent: Jun. 7, 2005

(54) TRANSMISSION SYSTEM FOR MULTICASTING DATA USING STATION ERROR STATUS FEEDBACK INFORMATION

(75) Inventors: Stijn Alexander Van Langen, Eindhoven (NL); Warner Rudolph Theophile Ten Kate, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 808 days.

(21) Appl. No.: 09/710,914

(22) Filed: Nov. 13, 2000

(30) Foreign Application Priority Data

Nov. 16, 1999 (EP) .......................................... 99203817

(51) Int. Cl.[7] .............................................. G06F 15/16
(52) U.S. Cl. ..................................... 709/237; 709/232
(58) Field of Search ............................... 709/230, 232, 709/237; 370/432, 216, 236, 229; 714/820, 746

(56) References Cited

U.S. PATENT DOCUMENTS

| | | | | |
|---|---|---|---|---|
| 5,487,168 A | * | 1/1996 | Geiner et al. ................... | 705/8 |
| 6,031,818 A | * | 2/2000 | Lo et al. ...................... | 370/216 |
| 6,501,763 B1 | * | 12/2002 | Bhagavath et al. ......... | 370/432 |
| 6,526,022 B1 | * | 2/2003 | Chiu et al. ................... | 370/229 |
| 6,577,599 B1 | * | 6/2003 | Gupta et al. ................ | 370/236 |
| 6,594,798 B1 | * | 7/2003 | Chou et al. ................. | 714/820 |

OTHER PUBLICATIONS

Byers et al., "Accessing Multiple Mirror Sites in Parallel: Using Tornado Codes to Speed up Downloads", Jun. 1999, IEEE, pp. 275–283.*

"Scalable Feedback Control for Multicast Video Distribution in the Internet", Proc. of the ACM SIGCOMM 1994, pp. 58–67.

J. Nonnenmacher et al., "Parity–Based Loss Recovery for Reliable Multicast Transmission", IEEE/ACM Transactions on Networking, US, IEEE Inc., NY, vol. 6, No. 4, Aug. 1998, pp. 349–361, XP000771969.

H. Linder et al., "A Forward error Correction Based Multicast Transport Protocol for Multimedia Applicants in Satellite Environments", Phoenix/Tempe., Feb. 1997, New York, IEEE, US, pp. 419–425, XP000753708.

L. Rizzo et al., "RMDP: An FEC–Based Reliable Multicast Protocol for wireless Environments", Mobile Computing and Communications Review, ACM, New York, US, Apr. 1998, vol. 2, No. 2, pp. 23–31, XP000738504.

* cited by examiner

*Primary Examiner*—Le Hien Luu

(57) ABSTRACT

The transmission system according to the invention can be used for reliably multicasting a group of data packets from a primary station (2) via a network (4), such as the Internet, to a plurality of secondary stations (6). The primary station (2) collects feedback information, which is related to a state of reception ($L_i$) of the group of data packets, from the secondary stations (6). In order to prevent an implosion of feedback information messages from congesting the network (4) the primary station (2) repeatedly transmits feedback requests, which comprise a reply probability value (p) and the worst state of reception ($L_{thresh}$) reported to the primary station (2) thus far, to the secondary stations (6). The secondary stations (6) transmit the feedback information to the primary station (2) in dependence on the reply probability value (p) and only when the state of reception ($L_i$) is worse than the worst state of reception reported thus far ($L_{thresh}$). The reply probability value (p) and the worst state of reception reported thus far ($L_{thresh}$) are adapted by the primary station (2) in dependence on the feedback information received so that a maximum number of feedback information messages are collected from the secondary stations (6) without congesting the network (4). If the state of reception ($L_i$) comprises the number of data packets erroneously received ($L_i$) by the secondary stations (6), the primary station (2) can transmit correction information based on this number of erroneously received data packets ($L_i$) and the group of data packets transmitted to the secondary stations (6) so that the secondary stations (6) can effectively correct the erroneously received data packets with the correction information.

9 Claims, 2 Drawing Sheets

TRANSMISSION SYSTEM FOR MULTICASTING DATA USING STATION ERROR STATUS FEEDBACK INFORMATION

BACKGROUND OF THE INVENTION

The present invention relates to a transmission system for multicasting data from a primary station via a network to a plurality of secondary stations, the primary station being arranged for collecting feedback information from the secondary stations, the feedback information being related to a state of reception of the data by the secondary stations.

The present invention also relates to a primary station for multicasting data via a network to a plurality of secondary stations, to a secondary station for receiving data via a network from a primary station and to a method of multicasting data from a primary station via a network to a plurality of secondary stations.

A transmission system according to the preamble is known from the paper entitled "Scalable Feedback Control for Multicast Video Distribution in the Internet" as published in the Proceedings of the ACM SIGCOMM '94, p. 58–67. Multicasting offers the possibility to transmit identical data to a large number of receivers in a more efficient way than via unicast connections. In the known transmission system a primary station multicasts video data packets via the Internet network to a plurality of secondary stations. After a number of data packets have been transmitted feedback information about the state of the network is solicited from the secondary stations. With this feedback information the rate at which the primary station transmits the data packets into the network can be adjusted so that congestion of the network can be prevented.

However, by soliciting information from a large number of secondary stations the network may become congested as many of the secondary stations simultaneously transmit feedback information to the primary station. In the known transmission system this so-called feedback implosion problem is tackled by eliciting the feedback information from the secondary stations in a series of rounds of probing. At the start of the series of rounds of probing both the primary station and the secondary stations generate random 16-bit keys. The primary station transmits its key in a feedback request to the secondary stations. The feedback request also comprises a number indicating the how many of the bits of the key are significant. Initially, all digits are significant. If the key generated by the primary station equals the key generated by a secondary station, using the declared number of significant bits, this secondary station transmits its local perception of the state of the network to the primary station. If there is no response within a timeout period set at twice the largest round trip time in the group of receivers, the number of significant bits is reduced and the primary station transmits a new feedback request comprising the same key and the reduced number of significant bits. This procedure is repeated until a state of the network is known by the primary station or until the feedback request was transmitted to the secondary stations with the number of significant bits being equal to zero.

In the known transmission system correction information is transmitted by the primary station to the secondary stations so that the secondary stations can correct any erroneously received data packets. However, this is only done when the number of secondary stations is relatively low so that there is little danger of feedback implosion. Furthermore, the feedback information in this case only consists of a negative acknowledgement by a secondary station that a data packet has been lost. After receipt of that negative acknowledgement the primary station encodes the blocks that were in that data packet using intramode coding and transmits the resulting correction information to the secondary station involved.

Despite these measures is the probability that an implosion of the feedback information occurs in the known transmission system still relatively high.

SUMMARY OF THE INVENTION

An object of the invention is to provide a transmission system according to the preamble in which the probability that an implosion of the feedback information occurs is relatively low. This object is achieved in the transmission system according to the invention, which is characterized in that the feedback information comprises the fraction of the data that was erroneously received by the secondary stations.

In this way only the fraction of the data that was erroneously received by the secondary stations, e.g. in the case where a group of data packets were transmitted this fraction could be the number of erroneously received data packets, is fed back to the transmitter. The amount of feed back information is thus relatively low compared to the situation in which a negative acknowledgement is fed back for each data unit comprised in the data that was erroneously received by the secondary stations.

An embodiment of the transmission system according to the invention is characterized in that the primary station transmits feedback requests to the secondary stations, the feedback requests comprising the maximum number of erroneously received data packets reported to the primary station thus far, the secondary stations being arranged for transmitting the number of erroneously received data packets to the primary station only when that number is larger than the maximum number of erroneously received data packets.

By these measures only those secondary stations that have a larger number of erroneously received data packets than the maximum number reported to the primary station (and included in the feedback requests) will report feedback information to the primary station. The amount of feedback information transmitted via the network is thus further reduced as well as the probability of a feedback implosion.

Another embodiment of the transmission system according to the invention is characterized in that the primary station is arranged for transmitting correction information to the secondary stations, the correction information being based on the number of erroneously received data packets and the group of data packets transmitted by the primary station, the secondary stations being further arranged for correcting the erroneously received data packets with the correction information.

In general, the data packets erroneously received by the secondary stations are mutually divergent, e.g. a secondary station A might have received the first and third data packets erroneously, while a secondary station B has erroneously received the third and fourth data packets erroneously. Furthermore, a secondary station C might have received only the first data packet erroneously. Despite the different erroneously received data packets it is possible for the primary station to transmit a single correction information code, such as a Reed-Solomon code or a Tornado code, to the secondary stations by means of which all the secondary stations can correct their erroneously received data packets.

In order to determine the correction information code the primary station needs to know the maximum number of erroneously received data packets by any of the secondary stations. By including the number of erroneously received data packets in the state of reception the secondary stations reply, in dependence on the reply probability value, their local number of erroneously received data packets only when this is worse, i.e. larger, than the maximum number of erroneously received data packets reported thus far. In this way, the maximum number of erroneously received data packets can be found relatively fast, while maintaining the relatively low feedback implosion probability. Furthermore, by means of these measures the erroneously received data packets can be corrected by the secondary stations and the transmission system is made more reliable.

An embodiment of the transmission system according to the invention is characterized in that the feedback requests are transmitted via a separate channel. The loss or erroneous receipt of feedback requests might be strongly correlated to the loss or erroneous receipt of the data packets. This can be prevented by using a separate return channel for the transmission of the feedback requests. When the data packets are multicasted via a satellite network a telephone connection is often used as return channel. In such a case, this telephone connection could also be used for the transmission of the feedback requests to the secondary stations.

BRIEF DESCRIPTION OF THE DRAWINGS

The above object and features of the present invention will be more apparent from the following description of the preferred embodiments with reference to the drawings, wherein.

Figure 1:
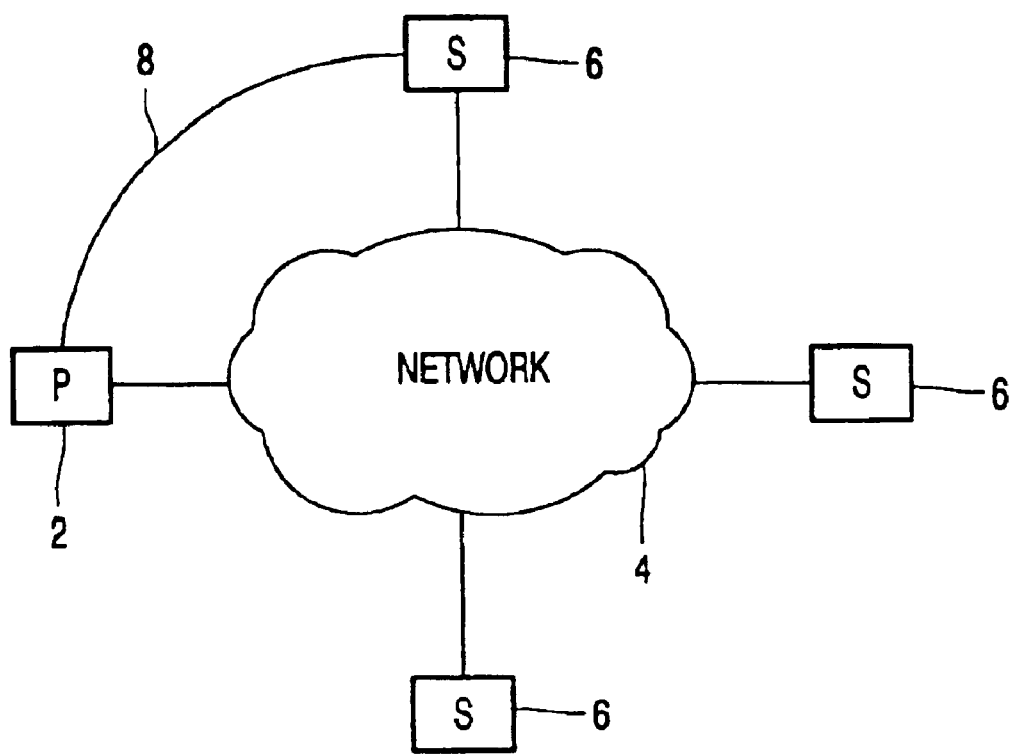
FIG. 1 shows a block diagram of an embodiment of the transmission system according to the invention.

Multicasting offers the possibility to efficiently transmit identical data from a primary station or transmitter via a network, e.g. the Internet, to a plurality of secondary stations or receivers. Traditionally the Internet has been used mostly for non-real time applications, like file transfer and web surfing. For real-time applications like audio and video the quality is not always acceptable. This is because the Internet Protocol (IP) offers only a best effort datagram service; no guarantees are given about packet loss rates and network jitter. This situation may improve in the future with the evolution towards an architecture which adds a certain level of quality-of-service to the Internet.

In order to make the Internet more suitable for real-time applications the effective data packet loss rates may be decreased at a higher level, by application of automatic repeat request (ARQ) from end-to-end. This improves the perceived quality at the cost of some extra delay needed for retransmissions. In other words, a small step backwards is made from streaming (simultaneous download and playback of continuous data) in the direction of playback-after-download. The secondary station will need a buffer to store transmitted data packets while waiting for retransmissions. ARQ requires the secondary station to give feedback to the primary station, in the form of ACKs or NACKs.

The multicast mode of IP is still not used very often in the Internet. One reason is the lack of standardized protocols for adding reliability and congestion control on top of IP multicast. To make multicast reliable one cannot generally apply the same techniques as in unicast. ARQ (as used for instance in TCP) suffers from scalability problems if the number of secondary stations is large: firstly, the retransmission of all the data packets that were lost by different secondary stations may take a long time and secondly, the return channel will be congested if many secondary stations simultaneously transmit their feedback information to the primary station ('feedback implosion'). Both scalability problems are particularly annoying when real-time data are multicast.

The forward scalability can be improved in an elegant way by using error correction codes. Instead of retransmitting original data if packets are lost, encoded data can be multicast on request, which enables different secondary stations to restore different losses using the same packets. This combination of ARQ with correction codes is known as a Type II hybrid ARQ.

Most known solutions for the feedback implosion problem use random delays or hierarchical aggregation. The first method reduces the return traffic stream by spreading it over time. This method in itself does not scale with the number of secondary stations but it is certainly useful in combination with other techniques. The second method uses a logical tree in the network, in which every node collects feedback from its children and sends it to the parent. This method has a better scaling behavior, but it requires a tree to be set up in the network. This is not always appropriate, e.g. when a satellite broadcast channel is used.

DESCRIPTION OF THE PREFERRED EMBODIMENTS

FIG. 1 shows a block diagram of an embodiment of the transmission system according to the invention. The transmission system comprises a primary station 2, a network 4 and a plurality of secondary stations 6. In the Figure only three secondary stations 2 are shown. However, the invention is not limited to this relatively small number of secondary stations 2 and can be used with any number of secondary stations 2. The transmission system multicasts groups of data packets from the primary station 2 via the network 4, e.g. the Internet, to the secondary stations 6. After a group of data packets has been transmitted to the secondary stations 6, the primary station 2 collects feedback information from the secondary stations 6 by repeatedly transmitting feedback requests to the secondary stations 6. In response to the feedback requests the secondary stations 6 transmit the feedback information to the primary station 2. The transmission system according to the invention may comprise a separate channel 8 by means of which the feedback requests can be transmitted from the primary station 2 to the secondary stations 6. Furthermore, this separate channel 8, e.g. a telephone line, can also be used by the secondary stations 6 to transmit the feedback information to the primary station 2.

Figure 2:
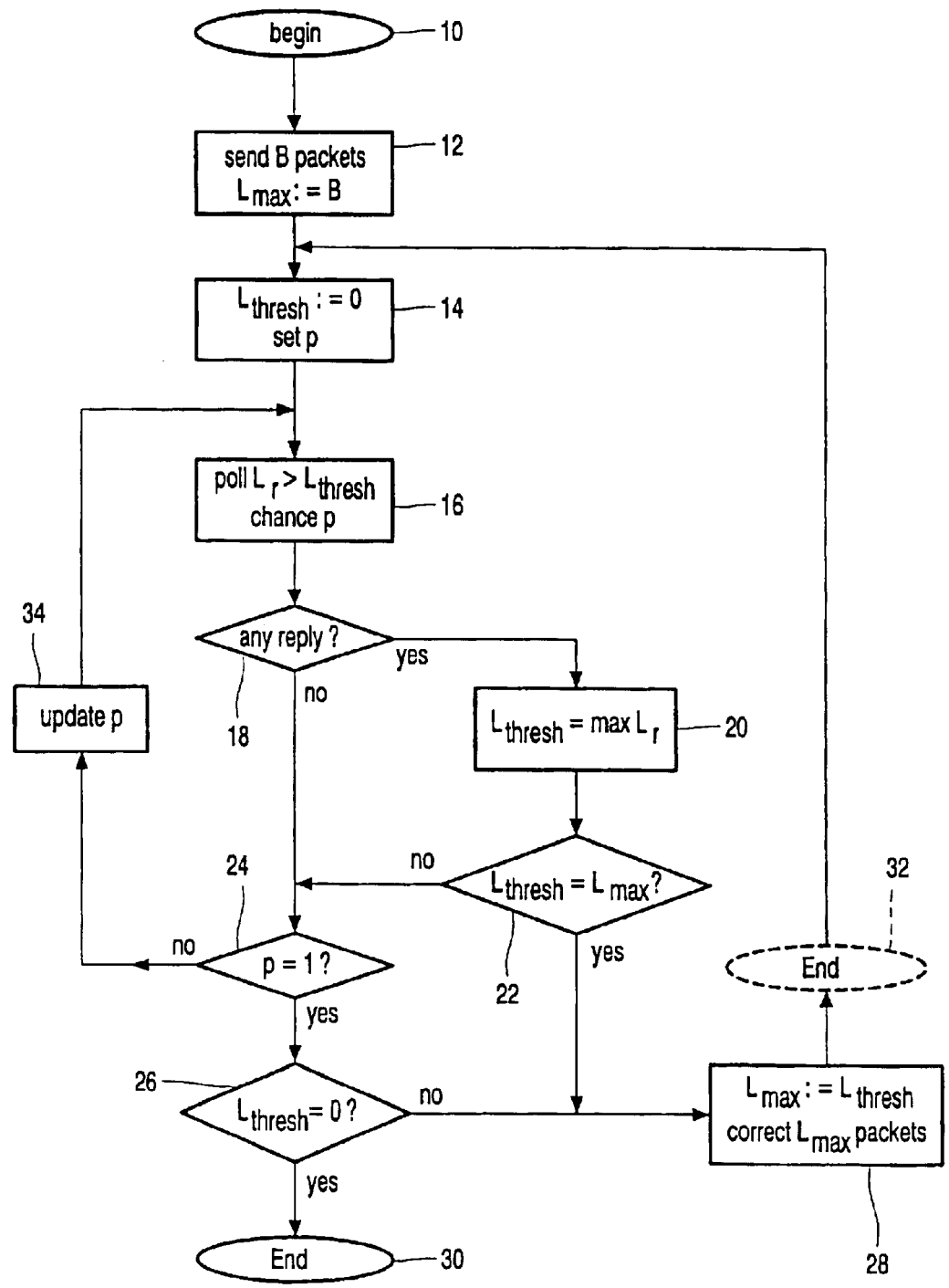
FIG. 2 shows a flow diagram illustrating the operation of an embodiment of the transmission system according to the invention.

FIG. 2 shows a flow diagram illustrating the operation of the transmission system according to the invention. Assume the following setting:

The primary station 2 wishes to deliver a continuous stream of data packets to G secondary stations 6 via the unreliable network 4;

A data packet is either received or lost by a secondary station 6; a corrupted packet is identified as such and is considered as lost. Different secondary stations 6 may miss different packets. The term 'lost data packet' is equivalent to the term 'erroneously received data packet';

The primary station 2 and/or the network 4 can handle only a limited amount of return traffic. $r_{max}$ is the maximal number of feedback messages that can be received by the primary station 2 in a time-span RTT, where RTT is the (measured) maximal round trip time from the primary station 2 to the secondary stations 6. The solution used for feedback reduction does not guarantee that the traffic is always below this maximum, it rather aims to give a statistical guarantee. In particular, the solution guarantees that an implosion (i.e. a reception of more than $r_{max}$ messages in a round) occurs with chance no more than $P_{max}$. The parameter $P_{max}$ can be chosen by the application. The overall goal is to improve reliability while keeping the additional delay as small as possible.

First, as shown in block 12, a group of B data packets is transmitted via the network 4. After that a feedback procedure is started, to inform the primary station 2 about the success of the transmission, in particular about the maximum number of data packets lost by any of the secondary stations 6. Then the primary station 2 multicasts a sufficient amount of erasure correction code allowing each secondary station 6 to restore its lost data packets. For perfect reliability the feedback and correction cycles should be repeated until every secondary station 6 has received all B original data packets in the group, but also a single correction round can be considered as a first improvement to the unreliable datagram service. After that correction round the primary station continues to transmit the next group of B data packets again followed by feedback and correction, etc.

The application of correction codes in reliable multicast has the great advantage that different secondary stations 6 can restore different packet losses using the same data. Thus this technique improves the scalability of data forwarding. The correction coding is done on the packet level and applied independently over each group of B data packets. Let's assume that B+C encoded data packets are generated, in such a way that each subset of B out of B+C data packets allows to restore the original data. The primary station 2 can either forward all B+C data packets (Forward Error Correction, FEC) allowing each secondary station 6 to miss at the most C data packets, or the primary station 2 can initially forward B data packets, and the rest only if necessary. Furthermore, a combination of both options can be used in which a part of the correction data is forwarded in advance, and the rest only on request. If the number C of available redundant data packets is sufficiently large one can transmit different correction data packets in subsequent correction rounds which all complement each other.

Reed-Solomon codes can be used in the correction information. They have the property that the number of lost data packets that can be restored equals the number of 'redundant' data packets. The decoding speed may be a limiting factor especially if B is large. This is because the secondary stations 6 need to invert a B×B-matrix, and operations are on a finite field GF(n) which is not the field of binary numbers in general. If this is a bottleneck one can use newer techniques like Tornado codes, which are based on parity operations and do not require matrix inversion. The price is that the number of data packets needed for decoding is suboptimal and may even vary in a non-deterministic way.

When losses are restored by sending correction information the primary station 2 only needs to know the maximum number of data packets lost $L_{max}$, which is then the number of correction packets he needs to transmit. It is the goal of the feedback procedure to find this number $L_{max}$ as fast as possible, while still obeying the (statistical) limitation on the amount of return traffic.

The organization of the feedback procedure is as follows. First (block 12 in FIG. 2), the primary station 2 transmits a group of B data packets and makes $L_{max}$ equal to B. The primary station 2 then transmits a poll request (feedback request) with two parameters, a reply probability p and a threshold $L_{thresh}$ representing the maximum number of lost packets reported by the secondary stations 6 thus far (block 16). Each secondary station i=1, ..., G is thereby asked to announce with probability p his number of lost data packets $L_i \le B$, but only if $L_i > L_{thresh}$. The primary station 2 collects responses until a timer expires (which is for instance twice the maximum round-trip time, as in the known transmission system). The primary station 2 repeats the polling, with new p and $L_{thresh}$ depending on the previously received answers, until p=1. Initially, $L_{thresh}$ is zero and p is as small as necessary to prevent an implosion (block 14). In later rounds $L_{thresh}$ is set to the maximum number of lost data packets reported in the previous poll (block 20), and p is increased in a controlled way taking care that the implosion chance does not exceed $P_{max}$ (block 34). At the end $L_{thresh}$ contains the maximum number of data packets lost and that number of correction packets can be transmitted to the secondary stations 6 (block 28).

Alternatively, $L_{thresh}$ might be initialized to −1 so that in a first round the number of receivers can be estimated. This information is important in determining the feedback implosion probability and can therefor be used for updating p.

In FIG. 2 the general case of multiple correction rounds in order to achieve perfect reliability is shown. If the number of correction rounds is restricted by e.g. real-time constraints, the protocol stops at the alternative (dashed) 'end' state 32.

Several strategies can be used for updating the reply probability value p (block 34). For instance, after a round in which no responses from the secondary stations 6 were collected the primary station could increase p according to:

$$p_{k+1} = \frac{1-\gamma}{\gamma} \frac{(\gamma P_{max})^{1/r_{max}}}{1-(\gamma P_{max})^{1/r_{max}}} \text{ where}$$

$$\gamma = \prod_{i=1}^{k}(1-p_i)$$

depends on the reply probabilities $p_1, \ldots p_k$ of the sequence of consecutive preceding polls that all gave zero responses. Furthermore, after a round in which at least one response from the secondary stations 6 was collected, the primary station 2 could leave p unchanged.

The above mentioned paper describes one way to implement the probabilistic replying of the secondary stations 6. A 16-bits random key is sent in the header of the polling request, together with a 4-bits number that gives the number of significant bits in the key. Each secondary station 6 independently draws a random 16-bits key as well, and compares it with the primary station key. Only if they coincide up to the given significance the secondary station sends a reply. By decreasing the number of significant bits the primary station 2 effectively increases p. In this scheme the values of p are restricted to $2^{-k}$, with k=0, 1, ..., 15. However, it is better to have a more fine-grained parameterization of p. Sometimes increasing p is allowed, but a factor of 2 (or a power of 2) is too large. In that case one can select an intermediate value. Each secondary station 6 similarly draws a random 16-bits key, and compares it with the 16-bits key in the feedback request. The secondary station 6 replies only if its key is smaller (over the full 16 bits; no reduced significance is used). The primary station key $b_1 b_2 \ldots b_{16}$ is not drawn randomly but is instead directly related to p: $p=0.b_1 b_2 \ldots b_{16}$, in binary notation. Thus $2^{16}$ equally spaced values between 0 and 1 are available for p, including the exponentially spaced values of the known transmission system.

The transmission system according to the invention can advantageously be used for reliably multicasting continuous streaming data such as audio and video data.

The scope of the invention is not limited to the embodiments explicitly disclosed. The invention is embodied in each new characteristic and each combination of characteristics. Any reference signs do not limit the scope of the claims. The word "comprising" does not exclude the presence of other elements or steps than those listed in a claim. Use of the word "a" or "an" preceding an element does not exclude the presence of a plurality of such elements.

What is claimed is:

1. A transmission system for multicasting data from a primary station via a network to a plurality of secondary stations, the primary station being arranged for collecting feedback information from the secondary stations, the feedback information being related to a state of reception of the data by the secondary stations wherein the feedback information comprises the traction of the data that was erroneously received by the secondary stations, wherein the data comprise a group of data packets and that the fraction comprises the number of data packets erroneously received by the secondary stations and wherein the primary station transmits feedback requests to the secondary stations, the feedback requests comprising the maximum number of erroneously received data packets reported to the primary station thus far, the secondary stations being arranged for transmitting the number of erroneously received data packets to the primary station only when that number is larger than the maximum number of erroneously received data packets.

2. A transmission system according to claim 1 wherein the primary station is arranged for transmitting correction information to the secondary stations, the correction information being based on the number of erroneously received data packets and the group of data packets transmitted by the primary station, the secondary stations being further arranged for correcting the erroneously received data packets with the correction information.

3. A transmission system according to claim 2 wherein the correction information comprises Reed-Solomon codes.

4. A transmission system according to claim 2 wherein the correction information comprises Tornado codes.

5. A transmission system according to claim 1 wherein the feedback requests are transmitted via a separate channel.

6. A secondary station for receiving data via a network from a primary station, the secondary station being arranged for providing feedback information to the primary station, the feedback information being related to a state of reception of the data by the secondary station, wherein the feedback information comprises the fraction of the data that was erroneously received by the secondary station, and the data comprise a group of data packets and that the fraction comprises the number of data packets erroneously received by the secondary station and the secondary station is arranged for receiving feedback requests from the primary station, the feedback requests comprising the maximum number of erroneously received data packets reported to the primary station thus far, the secondary station being arranged for transmitting the number of erroneously received data packets to the primary station only when that number is larger than the maximum number of erroneously received data packets.

7. A secondary station according to claim 6 wherein the secondary station is arranged for receiving correction information from the primary station, the correction information being based on the number of erroneously received data packets and the group of data packets transmitted by the primary station, the secondary station being further arranged for correcting the erroneously received data packets with the correction information.

8. A method of multicasting data from a primary station via a network to a plurality of secondary stations, the method comprising the primary station collecting feedback information from the secondary stations, the feedback information being related to a state of reception of the group of the data by the secondary stations, wherein the feedback information comprises the fraction of the data that was erroneously received by the secondary stations, wherein the data comprise a group of data packets and that the fraction comprises the number of data packets erroneously received by the secondary station and the primary station transmitting feedback requests to the secondary stations, the feedback requests comprising the maximum number of erroneously received data packets reported to the primary station thus far, and the secondary stations transmitting the number of erroneously received data packets to the primary station only when that number is larger than the maximum number of erroneously received data packets.

9. A method system according to claim 8, wherein the method further comprises:

the primary station transmitting correction information to the secondary stations, the correction information being based on the number of erroneously received data packets and the group of data packets transmitted by the primary station, the secondary stations correcting the erroneously received data packets with the correction information.

* * * * *